United States Patent [19]

Steed et al.

[11] Patent Number: 4,590,883
[45] Date of Patent: May 27, 1986

[54] FLAG MOUNTING

[75] Inventors: Ivan V. Steed; Jeffrey I. Gill, both of Adelaide, Australia

[73] Assignee: Steed Signs Pty. Limited, Australia

[21] Appl. No.: 482,913

[22] Filed: Apr. 7, 1983

[30] Foreign Application Priority Data

Dec. 9, 1982 [AU] Australia .................. PF7196

[51] Int. Cl.$^4$ .............................................. G09F 17/00
[52] U.S. Cl. ..................... 116/173; 116/28 R
[58] Field of Search ............. 116/173, 174, 175, 28 R, 116/30, 42, DIG. 24; 248/537, 539, 534, 208; 403/109, 326; 40/571, 572, 573; 224/42.42 R, 42.45 R, 273

[56] References Cited

U.S. PATENT DOCUMENTS

| 842,693 | 1/1907 | Patterson | 116/173 |
|---|---|---|---|
| 1,534,652 | 4/1925 | Lorenz | 116/173 |
| 1,743,694 | 1/1930 | Tierney | 248/537 |
| 1,757,280 | 5/1930 | Withrow | 248/208 |
| 2,644,475 | 7/1953 | Morton | 403/326 |
| 3,127,868 | 4/1964 | Guthrie | 116/173 |
| 3,241,516 | 3/1966 | Hopkins | 116/173 |
| 3,686,938 | 8/1972 | Binckley | 116/28 R |
| 4,158,925 | 6/1979 | Gagnon | 116/28 R |
| 4,163,426 | 8/1979 | O'Neill | 116/28 R |
| 4,519,153 | 5/1985 | Moon et al. | 116/173 |

FOREIGN PATENT DOCUMENTS

| 0454606 | 10/1926 | Fed. Rep. of Germany | 116/174 |
|---|---|---|---|
| 0611723 | 4/1934 | Fed. Rep. of Germany | 116/173 |

Primary Examiner—Robert I. Smith
Assistant Examiner—Patrick R. Scanlon
Attorney, Agent, or Firm—Pearne, Gordon, Sessions, McCoy, Granger, Tilberry

[57] ABSTRACT

A flag and flag mounting, the flag being formed from a strong durable material and mounted on a supporting rod clipped into a handle, the flag being retained between the handle and a knob on the rod. The handle can be inserted into a mounting block adapted to be retained between the window glass and upper frame of a vehicle door, or be attached to a mounting suction cup.

1 Claim, 6 Drawing Figures

U.S. Patent   May 27, 1986   Sheet 1 of 3   4,590,883
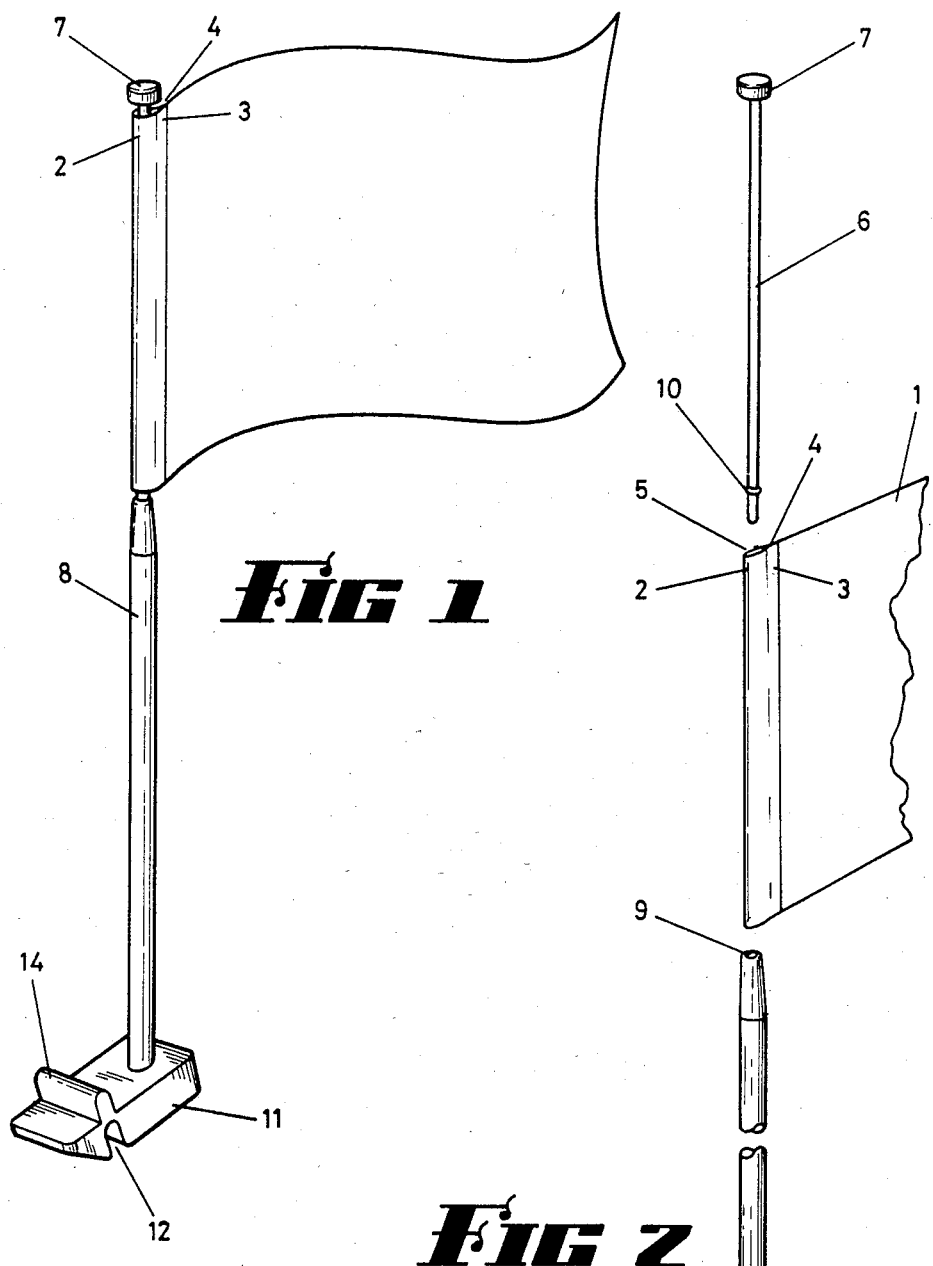

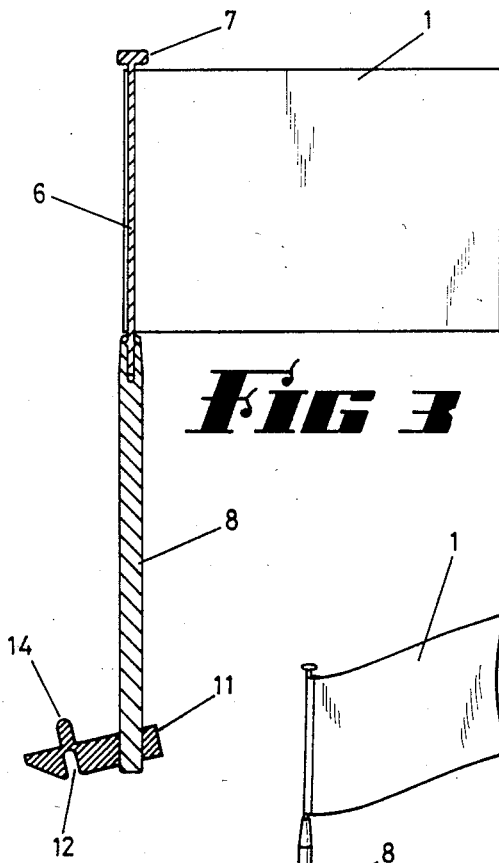
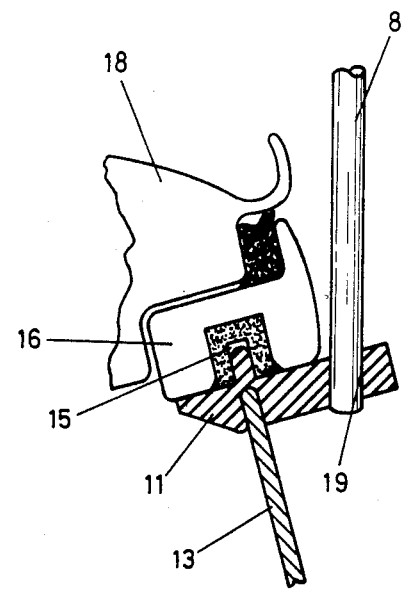
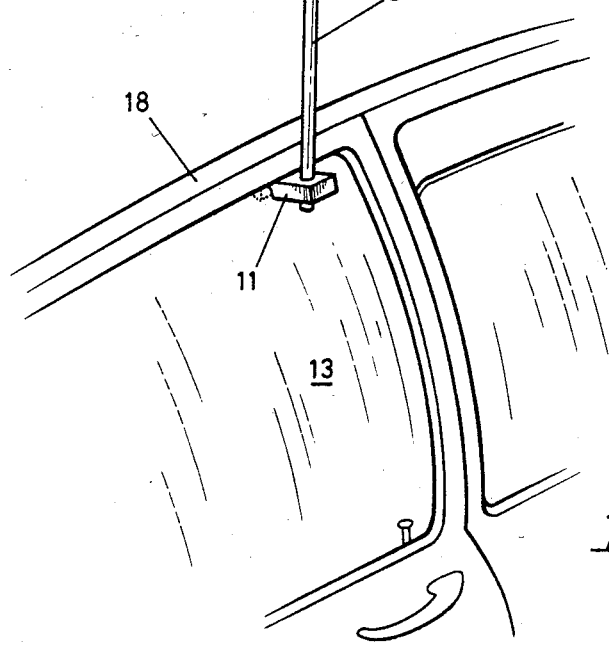

FLAG MOUNTING

This invention relates to improvements in and relating to flags, or particularly to smaller types of flags which can be used as hand held flags, flags for indoor and table decorations.

BACKGROUND OF THE INVENTION

Small flags which are adapted to be held in the hand for waving are known, and these are usually of paper, plastics material, or woven material and are attached directly onto a stick, by adhesive, stapling or the like.

However such flags are not entirely satisfactory and they can be easily torn, the printing and general appearance of the flag is not satisfactory, and that the attachment of the flag to the stick is an additional manufacturing step which adds to the price of the final product.

It is an object of this invention to provide a flag which overcomes one or more of the objections of the prior art and which flag can be readily packaged and would be economical to produce.

BRIEF STATEMENT OF THE INVENTION

Thus there is provided according to the invention a flag and supporting handle, the flag being of strong and durable material capable of being printed on both sides, the flag at its attachment end being provided with an extended portion adapted to be folded over on itself to form a hollow fold and adhered to the mating portions of the extended portion, a rod passing through the hollow fold, and co-operating means on said rod and handle whereby the rod is releasably retained in said handle.

BRIEF DESCRIPTION OF THE DRAWINGS

In order to more clearly describe the invention reference will now be made to the accompanying drawings in which:

FIG. 1 is a view of one form of the invention,

FIG. 2 is an exploded view of FIG. 1,

FIG. 3 shows the flag and handle in assembled condition in cross section,

FIG. 4 is a cross-sectional view attached to a vehicle window,

FIG. 5 is a perspective view of the flag attached to the window, and

DESCRIPTION OF THE PREFERRED EMBODIMENT

Figure 6:
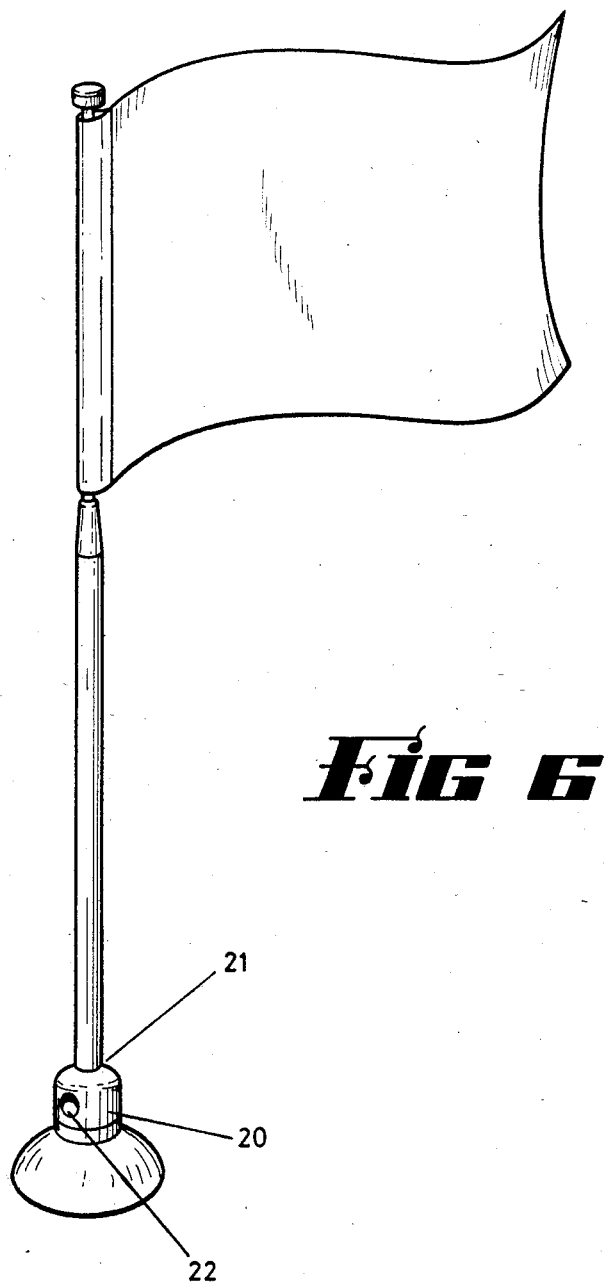
FIG. 6 is a view of the flag with an alternative mounting.

In a preferred form of the invention the material of the flag could be a material such as that sold under the Trade Mark "TYVEK" this material being a strong paper like material which is extremely difficult to tear.

The flag 1 at the attachment end is provided with an extended portion 2. The extended portion is adapted to be folded back over on itself and adhesive is provided on one or both areas 3, 4 so that the extended portion can be folded over so that the adhesive joins the two extended portions together to form a hollow fold or tube like portion 5.

The handle for the flag can be of a two part construction, the first being a rod 6 or stem of a material such as nylon, the rod having at one end a knob 7 or head which in operation would prevent the flag from sliding off the end of the rod.

At the other end the rod 6 is adapted to be inserted into a handle 8 with a friction fit, this handle being of greater diameter than the rod and preventing the flag from sliding downwardly off this end of the rod. Thus the handle 8 is of greater diameter than the internal diameter of the fold 5.

The handle 8 can be of any suitable material such as polypropylene or the like.

The handle has a small aperture 9 in its end so that the end of the rod can be inserted therein. The aperture towards its end is provided with a small circumferential groove (not shown), so that when the rod 6 is inserted in the handle, a circumferential abutment 10 clicks into the groove to retain the rod in the handle.

Flags are often desired to be mounted on vehicles, whether these be national or state flags, flags of sporting bodies or associations, festivals or the like. It has been the practise up to date to tie them in some way to the aerial of the motor vehicle. Other flags are attached by special mounting brackets for example to the bonnet of the vehicle especially for use by official cars.

One aspect of this invention is to provide a mounting for a flag which can be readily and easily attached to a vehicle as desired.

Thus the invention also provides a mounting which will attach the flag in a secure manner to a vehicle, the mounting including a mounting block, the block having means whereby it may be positioned in a vehicle window opening and secured in position by the upper edge of the window glass itself engaging the block to hold it against the upper edge of the window opening, means being provided in the block to receive the stem of the flag to lock and hold the flag in position.

In a preferred form of the invention the block 11 can be a generally rectangular block with on its lower surface a groove or slot 12 to receive the upper edge of the glass 13.

The top surface of the block is provided with a ridge 14 parallel to and opposite the window slot 12, this ridge 14 being adapted to pass into the window slot 15 in the door 16 closing against a seal 17 in the vehicle 18.

The handle 8 of the flag 1 is inserted into an aperture 19 in the block 11, this aperture being formed at an angle to the vertical so that the flag will generally be vertical when the block is inserted in the window opening.

The block is then positioned with its lower slot over the upper edge of the glass, and the window is then wound upwardly thus firmly locating the block against the upper edge of the window opening.

Thus the block and the lower end of the rod are clamped into the window opening, and with the window wound upwardly it is securely located to withstand the wind forces encountered during the driving of the vehicle, and also to prevent unauthorised removal of the flag and block.

The aperture may be a blind hole, or may be a hole passing through the block.

The block is only of a minimum depth so that in effect the window would only be open to a small degree and thus with the car parked would not allow sufficient room for any unauthorised entry into the vehicle through the window opening.

Also the small window opening with the block in position would not cause any undue effect to the heating or airconditioning of the vehicle, and while it may create a little wind noise, this would not be excessive for the block would only be positioned on certain occasions and would not be a permanent fixture to the vehicle.

The block can be formed of any suitable material, preferably one of the rigid plastics materials suitable for this purpose.

Although the above has been described as the mounting for a flag, it is to be realised that the mounting could carry other items such as display devices, signs, information plates or the like. These may be flexible or rigid as desired.

The aperture may have a circumferential groove adjacent its upper end to engage a ring on the stem to firmly locate the stem in position. Alternatively the stem may have an attachment means at its lower end to engage on the under surface of the block.

In a still further embodiment the stem may be a friction fit, or be glued or adhered to the hole.

The adhesive for the flag could be any suitable adhesive, and could be a water based adhesive so that it is merely necessary to moisten the adhesive, and fold the extended portion over the rod so that the two portions of the flag thus are joined to each other. In this way the handle can be removed and the rod slid out of the tubular socket so formed if desired.

In accordance with the embodiment of the invention this rod can be slid into another flag, or a smaller flag which may perhaps be a quarter of the size or half the size may be attached to the rod, and the rod then can be used for a decoration on a table, or on food or the like by merely pushing the rod into a suitable holder or the food itself if desired so that the rod and a smaller size flag can thus be used as an indoor or table decoration.

The adhesive on the flags may be of any desired adhesive such as a water based adhesive, or a contact adhesive or of the "press-seal" form of adhesive and the adhesive may be applied in two strips, or only on one portion of the extended portion and the other can be pressed against this adhesive portion for attachment to the peg or stem.

The flags can thus be printed on both sides, and the peg or stem and handle by being two portions can readily be packed either in the flat form, or the flag could be rolled around the assembled rod and handle.

The printing can be any suitable form such as by screen printing, off-set printing or the like and the flags could be of any desired nature either the flags for countries, states, cities, sporting bodies, festivals or the like.

As described above, the flag can be a hand held flag, and in a further embodiment, the handle can be fitted to a suction cup 20. This cup is provided with the usual axial hole 21 into which the handle can be fitted. Also the suction cup is provided with a transverse hole 22 passing through the cup. In this way the flag can be supported on a vertical surface with the handle facing vertically or horizontally if desired. Hence it can be mounted on a vehicle window, the flag portion itself on the aerial of a vehicle, or as a decoration indoors or outdoors as desired, even as a table or rostrum decoration.

We claim:

1. In combination, a flag, a separable two-piece flag mast and mounting means for mounting the flag in the window opening of a vehicle, the flag having a tubular mounting fold at one end thereof, said two-piece mast comprising a supporting rod to freely pass through said fold and a handle to which said supporting rod is separably joined, said supporting rod having a knob at an upper end thereof and a circumferential abutment adjacent a lower end thereof, said handle being of greater outer diameter than said tubular fold and having an aperture at an upper end thereof with a circumferential groove in said aperture to frictionally receive said supporting rod lower end with said circumferential abutment nesting into said circumferential groove to firmly hold said two-piece mast together with the flag being vertically supported only by said handle upper end and permitting easy separation of said two-piece mast for removal of the flag, said mounting means comprising a rigid mounting block, said mounting block having a recess in a lower surface of said block to receive an upper edge of a glass window of the vehicle, and a rib on an upper surface of said block, said rib being parallel to and opposite said recess to enter a window slot in the vehicle so that said block is firmly held between said window slot and said window upper edge when the window is closed, the distance between the bottom of said recess and said upper surface of the block being minimal, and an aperture in said block to receive said handle, whereby in use said supporting rod is passed throught the tubular mounting fold of the flag and said supporting rod lower end is inserted into said aperture of said handle with said circumferential abutment firmly nesting into said circumferential groove so that said flag is retained and supported below said knob and on said handle upper end, and said handle is inserted into said aperture in said block, the block being positioned over the upper edge of the glass of the window which is then raised to engage said rib in said window slot, said minimal distance allowing the window to be substantially closed.

* * * * *